United States Patent
Tappan et al.

(10) Patent No.: US 7,246,175 B1
(45) Date of Patent: Jul. 17, 2007

(54) IPV6 OVER MPLS IPV4 CORE

(75) Inventors: Daniel C. Tappan, Boxborough, MA (US); Eric C. Rosen, Arlington, MA (US); Ole Troan, Redhill (GB); Parag Jain, Nepean (CA); Eric Levy-Abegnoli, Nice (FR); Luc Revardel, La Gaude (FR); Francois Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 602 days.

(21) Appl. No.: 10/013,818

(22) Filed: Dec. 7, 2001

(51) Int. Cl.
*G06F 15/16* (2006.01)
(52) U.S. Cl. .................. 709/245; 709/238; 370/392
(58) Field of Classification Search ............. 709/238, 709/245, 246; 370/392, 352, 230
See application file for complete search history.

(56) References Cited

U.S. PATENT DOCUMENTS

| | | | |
|---|---|---|---|
| 6,212,184 B1 * | 4/2001 | Venkatachary et al. | 370/392 |
| 6,532,217 B1 * | 3/2003 | Alkhatib et al. | 370/252 |
| 6,708,219 B1 * | 3/2004 | Borella et al. | 709/245 |
| 6,735,199 B1 * | 5/2004 | Ofek | 370/389 |
| 6,741,585 B1 * | 5/2004 | Munoz et al. | 370/352 |
| 2001/0040895 A1 * | 11/2001 | Templin | 370/466 |
| 2002/0073215 A1 * | 6/2002 | Huitema et al. | 709/230 |

OTHER PUBLICATIONS

Information Sciences Institute, University of Southern California, "Darpa Internet Program Protocol Specification", IETF RFC 791, Sep. 1981.
Y. Rekhter, "A Border Gateway Protocol 4 (BGP-4)", IETF RFC 1771, Mar. 1995.
S. Deering, "Internet Protocol, Version 6 (IPv6) Specification", IETF RFC 2460, Dec. 1998.
P. Marques, "Use of BGP-4 Multiprotocol Extensions for IPv6 Inter-Domain Routing" IETF RFC 2545, Mar. 1999.
T. Bates, "Multiprotocol Extensions for BGP-4", IETF RFC 2858, Jun. 2000.
E. Rosen, "Multiprotocol Label Switching Architecture", IETF RFC 3031, Jan. 2001.
M. A. Miller, P.E., "Implementing IPv6", Second Edition, pp. 285-310.

* cited by examiner

*Primary Examiner*—David Wiley
*Assistant Examiner*—Kyung-Hye Shin
(74) *Attorney, Agent, or Firm*—Cindy Kaplan

(57) ABSTRACT

IPv6 traffic may be carried through an MPLS IPv4 network without the use of IPv6-over-IPv4 tunneling. This provides great savings in overhead, signaling, and state information storage and also allows for routing through the MPLS IPv4 network to adjust in response to changes in network state. In one embodiment, an edge node of an MPLS IPv4 network resolves a destination IPv6 network of a received IPv6 packet to an MPLS label switched path. The resolution exploits received inter-domain routing information. This information identifies the IPv4 address of an egress node that is usable as a gateway to the destination network. Within the inter-domain routing information, the IPv4 address may be encoded in IPv6 format.

21 Claims, 6 Drawing Sheets

IPV6 OVER MPLS IPV4 CORE

STATEMENT OF RELATED APPLICATIONS

The present invention is related to the subject matter of co-filed and co-assigned U.S. patent application Ser. No. 10/013,817, entitled "Two Label Stack for Transport of Network Layer Protocols over Label Switched Networks", the contents of which are herein incorporated by reference in their entirety for all purposes.

BACKGROUND OF THE INVENTION

The present invention relates to data communication networks and more particularly to systems and methods for facilitating interoperation between currently deployed Internet infrastructure and newer Internet infrastructure employing next generation protocols.

To accommodate the explosive growth of the Internet, a very large number of network nodes have been configured to employ IP (Internet Protocol). These nodes range from user workstations to very high throughput core routers. There have been successive versions of IP but as of the filing date of the present application, the predominant variant of IP deployed in the field is IPv4.

In recent years, many service providers have deployed IPv4 core networks that employ a forwarding mechanism referred to as MPLS (Multiprotocol Label Switching). Such networks are referred to herein as MPLS IPv4 networks. MPLS employs labels, rather than the contents of the IP packet to make forwarding decisions at each intermediate node. At each hop, an output interface and a substitute label are selected based solely on the received packet label. This provides advantageous flexibility in the deployment of new beneficial routing schemes. For example, the use of MPLS facilitates traffic engineering to shift traffic from congested paths to paths with excess capacity, fast re-routing around failed links or nodes, and large-scale virtual private network (VPN) deployment.

The Internet engineering community is planning and implementing a shift from IPv4 to IPv6. Advantages of IPv6 include an enormous expansion in the available address space to accommodate both greater ubiquity of Internet-enabled devices as well as less reliance on cumbersome network address translation schemes which have been utilize to conserve addresses. IPv6 also provides highly useful auto-configuration capabilities.

Service providers wish to offer IPv6 connectivity through their core networks while minimizing expense and configuration difficulties. Immediately replacing the core network infrastructure with MPLS IPv6 equipment is economically unviable for many service providers. Reconfiguring MPLS IPv4 routers to support both IPv4 and IPv6 raises challenges in the areas of hardware incompatibility with IPv6 forwarding requirements, network management, stability, and commercial availability of appropriate software.

Despite the fact that MPLS IPv4 networks makes forwarding decisions based on labels rather than IPv4 destination addresses, interoperation with IPv6 equipment is nonetheless problematic. An edge router configured to provide ingress access to the MPLS IPv4 network will expect each incoming packet to have an IPv4 address on which to base a selection of initial label. Furthermore, inter-domain routing information received at the ingress edge node will use the IPv6 addressing scheme to specify an address prefix of a destination network and the address of an edge node of the core network that can be used as a gateway to reach this destination network. Additionally, the mechanism by which labels are distributed among nodes of an MPLS IPv4 network relies on the IPv4 address scheme.

Thus, a need arises to forward IPv6 traffic over the MPLS IPv4 core so that service providers can offer IPv6 services without any upgrading or reconfiguration of their core network. One proposed solution is to employ some type of tunneling mechanism (e.g., IPv6-over-IPv4) where each IPv6 packet is encapsulated into an IPv4 packet that in turn is encapsulated into MPLS. Using this type of encapsulation over MPLS, however, brings several drawbacks. There is extra overhead resulting from the added header information. Furthermore, establishing numerous static tunnels requires additional configuration and storage of state information while use of dynamic tunnels requires support of specific software mechanisms, activation/configuration of these software mechanisms and furthermore involves constraints on IPv6 addresses to be allocated.

What is needed are systems and methods for forwarding IPv6 packets across an MPLS IPv4 network without employing IPv6-over-IPv4 tunnels.

SUMMARY OF THE INVENTION

By virtue of one embodiment of the present invention, IPv6 traffic may be carried through an MPLS IPv4 network without the use of IPv6-over-IPv4 tunneling. This provides great savings in overhead, signaling, and state information storage and also allows for routing through the MPLS IPv4 network to adjust in response to changes in network state. In one embodiment, an edge node of an MPLS IPv4 network resolves a destination network of a received IPv6 packet to an MPLS label switched path. The resolution exploits received inter-domain routing information. This information identifies the IPv4 address of an egress node that is usable as a gateway to the destination IPv6 network. Within the inter-domain routing information, the IPv4 address may be encoded in IPv6 format.

One aspect of the present invention provides a method for operating a network node to forward a packet employing a first addressing scheme through a label-switched network employing a second addressing scheme. The method includes: receiving the first addressing scheme packet, extracting destination address information from the first addressing scheme packet, selecting a label and a next hop into the label-switched network based on the destination address information, and forwarding the first addressing scheme packet along with a label to the next hop without encapsulation within a packet incorporating address information specified by said second addressing scheme.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application where IPv6 traffic is to be forwarded across an MPLS IPv4 network. It will be appreciated, however, that similar functionality may be employed in other situations where different network protocols are desired to interoperate while avoiding the use of statically configured tunnels or tunnels that constrain the permissible addresses of their endpoints. Also, other label switching schemes may be used instead of MPLS.

Figure 1:
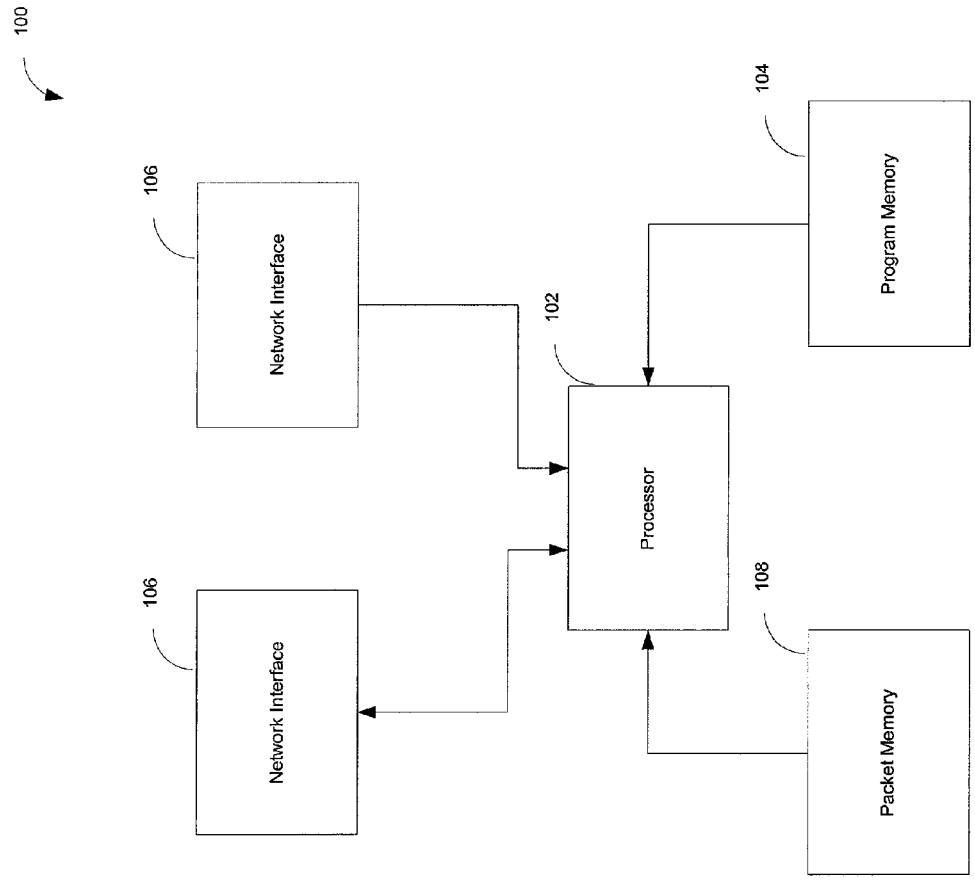
FIG. 1 depicts a network device suitable for implementing one embodiment of the present invention.

FIG. 1 depicts a network device 100 that may be used to implement a network node operating in accordance with the present invention. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory such as a random access memory (RAM). Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality (two are depicted) of network interfaces 106. For example, one of network interfaces 106 may couple to an optical fiber and may incorporate an appropriate physical and link layer functionality. Other examples of network interfaces include Ethernet interfaces, DSL interfaces, Gigabit Ethernet interfaces, 10-Gigabit Ethernet interfaces etc. Packets that are received, processed, and forwarded by network device 100 may be temporarily stored in a packet memory 108. Depending on its role, network device 100 implements various network protocols, extensions thereof, and data networking features provided by the present invention as will be explained below.

The description that follows refers to various protocols in use on the Internet as specified by the following documents, all of which are incorporated by reference herein in their entirety for all purposes:

Postel, "Internet Protocol," Request for Comments 791, Internet Engineering Task Force, September 1981.

Rekhter, et al., "A Border Gateway Protocol 4 (BGP-4)," Request for Comments 1771, Internet Engineering Task Force, March 1995.

Bates, et al., "Multi-Protocol Extensions for BGP-4," Request for Comments 2858, Internet Engineering Task Force, June 2000.

Marques, et al., "Use of BGP-4 Multi-Protocol Extensions for IPv6 Inter-Domain Routing," Request for Comments 2545, Internet Engineering Task Force, March 1999.

Deering, et al., "Internet Protocol, Version 6 (IPv6)," Request for Comments 2460, Internet Engineering Task Force, December 1998.

Rosen, et al., "Multi-Protocol Label Switching Architecture," Request for Comments 3031, Internet Engineering Task Force, January 2001.

Figure 2:
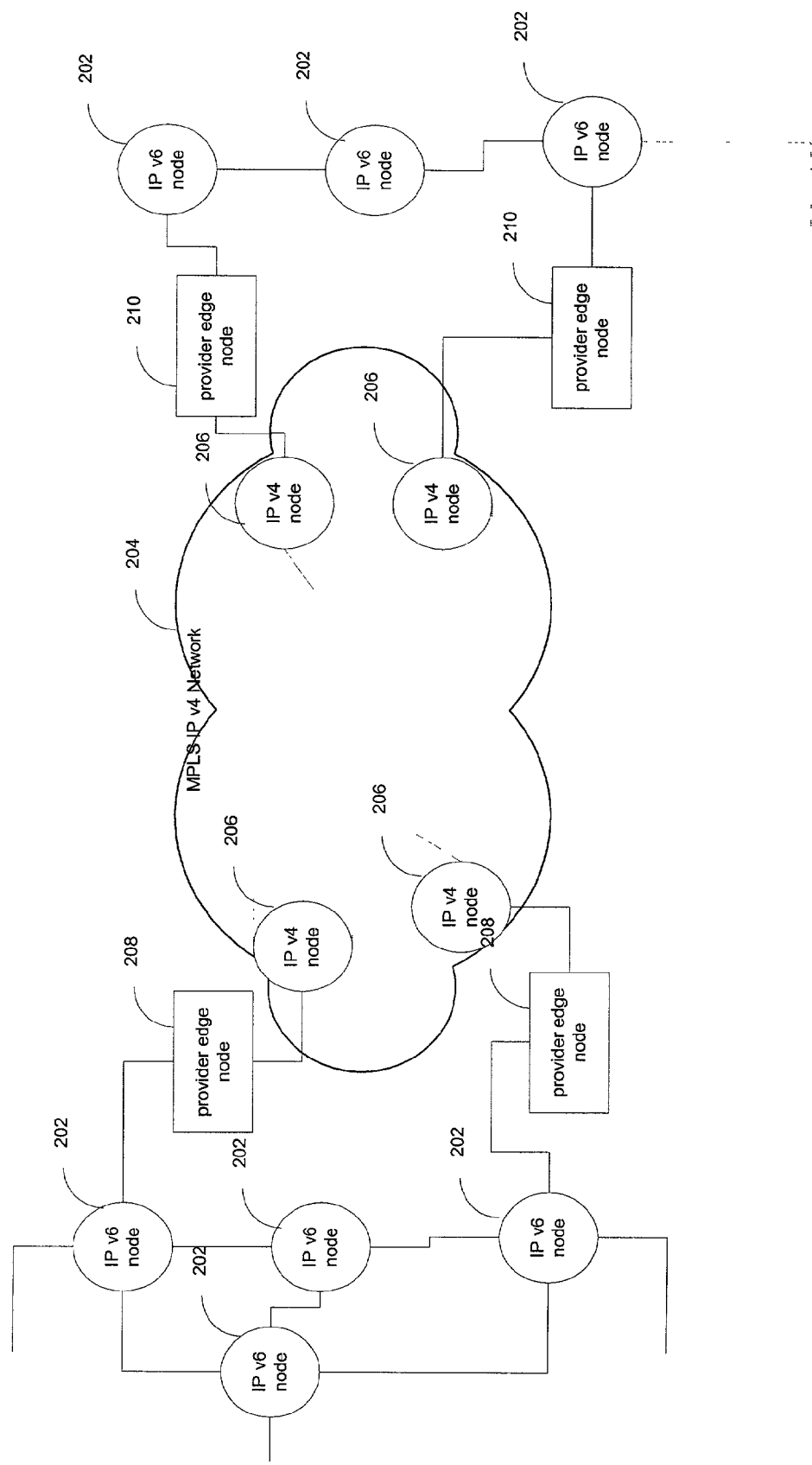
FIG. 2 depicts a mixed IPv4 and IPv6 network according to one embodiment of the present invention.

FIG. 2 depicts a networking environment suitable for implementing one embodiment of the present invention. There are three types of network nodes depicted in FIG. 2. IPv6 nodes 202 implement IPv6 network layer functionality. There is also an MPLS IPv4 network 204 to implement the core. Network 204 includes IPv4 nodes 206. Interior nodes of network 204 are omitted from FIG. 2 for clarity of depiction.

Each of IPv4 nodes 206 make forwarding decisions based on labels of received packets. The labels are used as keys to an MPLS label forwarding table that provides a substitute label and a selection of output interface. The contents of the label forwarding table at each node are established by a distributed process of translating IP routing control information into labels and then propagating these labels to the nodes where they are needed. The routing information provided by the IP routing control protocols specifies associations between destination addresses and destination networks (generically referred to as forwarding equivalence classes or FECs) and next-hop nodes. The routing control protocols specify the FECs and next hop nodes using the addressing scheme of IPv4. The distribution of labels within network 204 is also based on IPv4 with the destinations of any particular block of label information being specified using an IPv4 address.

Provider edge nodes 208 and 210 represent a third class of node. The provider edge nodes 208 and 210 have IPv6 addresses and can fully interoperate with IPv6 nodes 202 in accordance with the IPv6 protocol. They also have IPv4 addresses used for communicating with IPv4 nodes 206. To facilitate operations in accordance with the invention, the IPv4 addresses of provider edge nodes 208 and 210 may be encoded in IPv6 format when advertised by an operative interdomain routing protocol such as MP-BGP. This encoding may take the form of a reversible transformation such as e.g., zero-filling the 32 bit address to 128 bits, or any other such reversible transformation.

Provider edge nodes 208 and 210 also incorporate IPv4 network layer functionality. According to the present invention, provider edge nodes 208 and 210 are specially configured to forward IPv6 packets across MPLS IPv4 network 204 without resorting to IPv6-over-IPv4 tunneling.

For convenience of description the provider edge nodes are divided into ingress nodes 208 and egress nodes 210. An ingress node acts as an entry point to MPLS IPv4 network 204 while an egress node acts as an exit point. Although in FIG. 2, each edge node is depicted as either an ingress node or an egress node, every edge node will be able to operate as either an ingress node or an egress node depending on the direction of packet flow.

Figure 3:
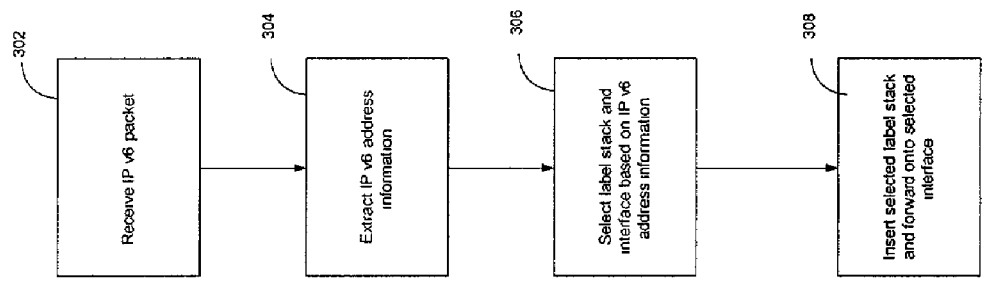
FIG. 3 is a flow chart describing steps of forwarding an IPv6 packet into an MPLS IPv4 network according to on embodiment of the present invention.

FIG. 3 is a flow chart describing steps for forwarding an IPv6 packet across MPLS IPv4 network 204 according to one embodiment of the present invention. At step 302, an ingress edge node 208 receives an IPv6 packet. At step 304, the ingress edge node extracts the destination IPv6 address from the received IPv6 packet.

Figure 4:
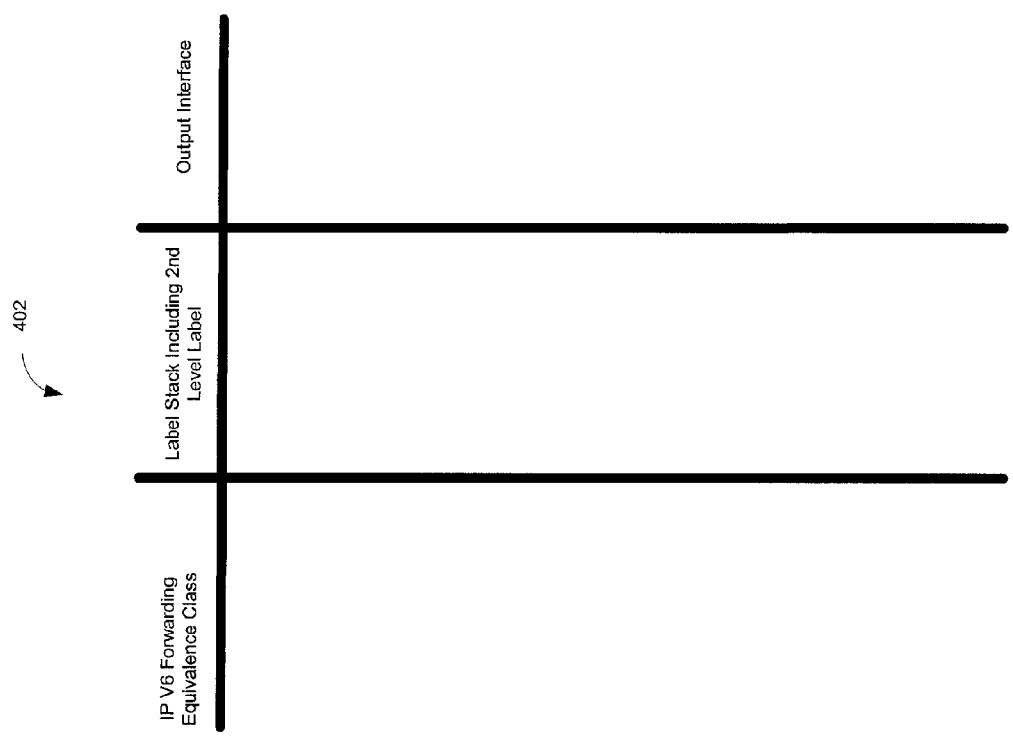
FIG. 4 depicts an enhanced IPv6 forwarding table according to one embodiment of the present invention.

At step 306, the ingress node references a special IPv6 forwarding table to retrieve information useful in forwarding the IPv6 packet. FIG. 4 depicts the contents of this enhanced IPv6 forwarding table 402. A key column is depicted as the left column and identifies IPv6 forwarding equivalence classes (FECs) which are typically IPv6 address prefixes identifying destination networks. The center column gives an MPLS label stack to be used in forwarding packets through the MPLS IPv4 network. A portion of the label stack consisting of one or more labels specifies an LSP through the MPLS IPv4 core. The LSP extends from the ingress node 208 through MPLS IPv4 network 204 to an egress node 210 that will act as a gateway to the destination network of the IPv6 packet.

The label stack also includes what will be referred to as herein as a "second level label". The second level label is not used for making forwarding decisions within MPLS IPv4 network 204 but is rather included to facilitate handling of the IPv6 packet at the penultimate node and egress node of the LSP. Further details of the generation and handling of the second layer label are disclosed in the co-filed, co-assigned application entitled "Two Label Stack for Tunneling Network Layer Protocols over MPLS." The right column of table 402 specifies an output interface for use in forwarding packets to the identified destination network. Table 402 is but one example of a data structure useful for storing and retrieving this type of forwarding information.

The ingress node 208 applies the well-known longest match technique to the destination address of the IPv6 packet to select and retrieve a particular entry in table 402. Then at step 308, ingress node 208 forwards the IPv6 packet into MPLS IPv4 network 204 by encapsulating the packet with the label stack retrieved from table 402 and transferring the packet to the output interface identified by the retrieved entry.

Figure 5:
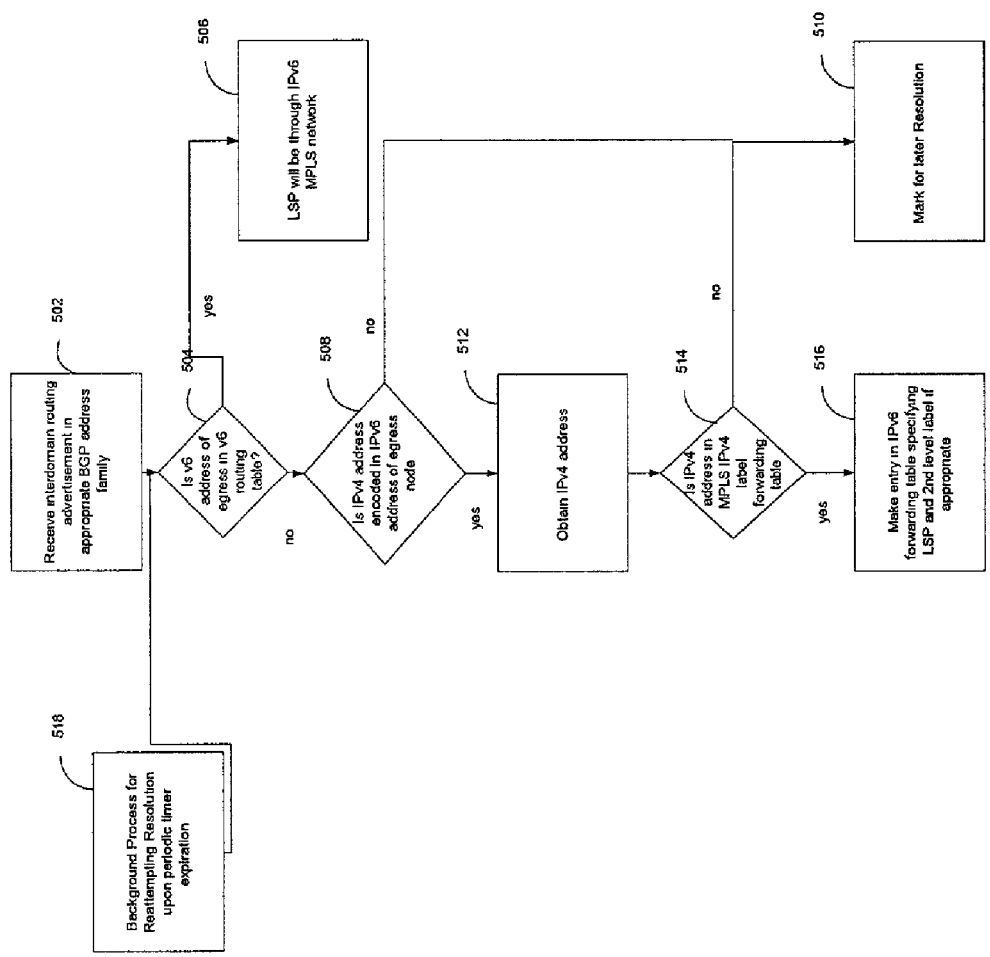
FIG. 5 is a flowchart describing steps of establishing the contents of the table of FIG. 4 in response to received inter-domain routing advertisements.

FIG. 5 is a flow chart describing steps of establishing the contents of table 402 of FIG. 4. Operation in generating and receiving the inter-domain routing advertisements is governed by an appropriate version of a Border Gateway Protocol (BGP) such as MP-BGP augmented with features to support MPLS. FIG. 5 describes the handling of a single data item received in an inter-domain routing advertisement.

At step 502, the ingress node 208 receives an inter-domain routing advertisement. In accordance with MP-BGP, the received inter-domain routing advertisement is marked as relating to the "IPv6+label" address family or other suitable address family that has been negotiated between the BGP peers.

The inter-domain routing advertisement will specify a destination network by prefix and an IPv4 address of an egress node 210 that can be used to reach that destination network with the IPv4 address being preferably encoded in an IPv6 address format as discussed above so that it appears to be an IPv6 address. The inter-domain routing advertisement will also include a second level label that has been assigned by that egress node.

At step 504, the ingress node 208 checks the IPv6 address identifying egress node 210 given in the advertisement to see if it is in a local IPv6 routing table. If the IPv6 address is in the IPv6 routing table, the inter-domain routing information does not relate to tunneling through an MPLS IPv4 network but, e.g., may instead relate to tunneling through an MPLS IPv6 network. Processing then proceeds to step 506 which further handles the routing advertisement in the appropriate manner. Details of step 506 are not pertinent to the present invention.

If the IPv6 address found in the advertisement is not found in the IPv6 routing table then processing proceeds to step 508. Step 508 tests if the IPv6 address in fact represents an encoded IPv4 address as would be expected for operation compatible with this embodiment of the present invention. If the IPv6 address does in fact encode an IPv4 address, then, at step 512, the IPv6 address is translated into an IPv4 address. This is done in a way appropriate to whatever transformation has been defined between the two address spaces. For example, an appropriate number of leading zeroes may be removed from the IPv6 address to generate the IPv4 address. If the IPv6 address does not in fact encode an IPv4 address, processing proceeds to step 510 where the routing information contained in the advertisement is marked for later resolution.

Figure 6:
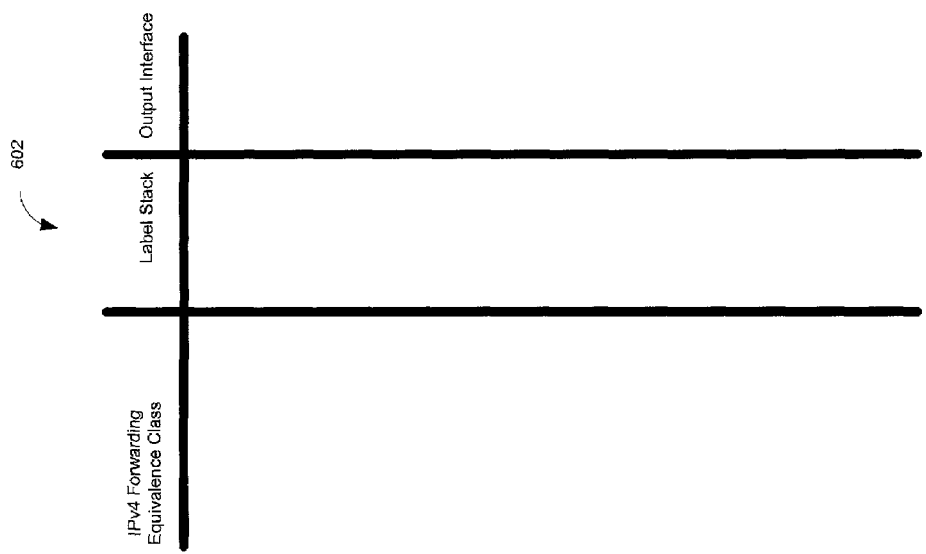
FIG. 6 depicts an IPv4 forwarding table usable in implementing one embodiment of the present invention.

Following step 512, at step 514, the IPv4 address is used as a reference to an IPv4 forwarding table to find an LSP through MPLS IPv4 network 204. FIG. 6 depicts an IPv4 forwarding table 602 as is incorporated within ingress node 208. The key (left) column to table 602 lists IPv4 forwarding equivalence classes. The other columns identify the associated label stack and output interface to be used in forwarding the packet into MPLS IPv4 network 204. The MPLS label stack in effect identifies an LSP. The contents of table 602 are established in accordance with the routing control, label binding, and label distribution protocols employed by MPLS IPv4 network 204.

During step 514, the ingress node 208 uses the exact match technique to select an entry in IPv4 forwarding table 602. If step 514 does not find an entry for the IPv4 address then, processing proceeds to step 510 where the new inter-domain routing information is marked for later resolution. If an entry is found then a new entry to IPv6 forwarding table 402 may be added at step 516. The new entry includes: 1) the IPv6 forwarding equivalence class identified by destination prefix, 2) a label stack that incorporates the MPLS label stack retrieved from IPv4 forwarding table 602 as augmented with the second level label found in the advertisement, and 3) the output interface identifier retrieved from the entry in IPv4 forwarding table 602.

In parallel with the just-described process that occurs in response to receipt of an inter-domain routing advertisement, a step 518 implements a background process for repeating the resolution of previously received destination network prefixes. This occurs both for destination prefixes previously resolved by execution of step 516 and for those marked for later resolution at step 510. Thus upon periodic expiration of a timer at step 514, step 504 is visited to reinitiate resolution for each previously received prefix. This allows for rapid adaptation for, e.g., availability of new LSPs.

Referring again to the contents and structure of IPv6 forwarding table 402, it should be noted that where inter-domain routing advertisements identify multiple paths to the same destination network, BGP will operate to select the best path. Also, wherever the term "table" is referred to herein, it will be appreciated that this also encompasses other data structures that can be similarly queried.

Thus, in one embodiment, the present invention provides a mechanism for forwarding IPv6 packets across an MPLS IPv4 network without the need for IPv6-over-IPv4 tunneling. This saves significantly in overhead, signaling, and storage of state information and also avoids the problems associated with the static configuration of IPv6-over-IPv4 tunnels. This capability facilitates an economical evolution path towards IPv6 capabilities where IPv6 services may be provided to end users prior to the replacement and/or modification of core network infrastructure.

It is understood that the examples and embodiments that are described herein are for illustrative purposes only and various modifications are changes in light thereof will be suggested to persons skilled in the art and are to be included within the spirit and purview of this application and scope of the appended claims and their full scope of equivalents.

The invention claimed is:

1. A method for operating a network node to forward a packet employing a first addressing scheme through a label switched network employing a second addressing scheme, said method comprising:

receiving said first addressing scheme packet;

extracting destination address information according to said first addressing scheme from said first addressing scheme packet;

retrieving from a forwarding table, an MPLS label stack specifying a label switched path in said label switched network employing said second addressing scheme, said MPLS label stack selected based on said destination address information according to said first addressing scheme, said forwarding table comprising said destination address information identifying a forwarding equivalence class and said corresponding MPLS label stack; and forwarding said first addressing scheme packet along with said label to a next hop in said label switched path without encapsulation within a packet incorporating address information specified by said second addressing scheme.

2. The method of claim 1 wherein said first addressing scheme comprises an IPv6 addressing scheme and said first addressing scheme packet comprises an IPv6 packet and said second addressing scheme comprises an IPv4 addressing scheme.

3. The method of claim 2 wherein said label switched network comprises an MPLS IPv4 network.

4. The method of claim 1 wherein said forwarding table is an IPv6 forwarding table and further comprising:

establishing contents of said IPv6 forwarding table based on a received inter-domain routing advertisement, wherein said inter-domain routing advertisement comprises an IPv4 address of an egress node configured to reach a destination network associated with said destination address information.

5. The method of claim 4 wherein establishing contents comprises:

extracting a forwarding equivalence class identifier from said inter-domain routing advertisement;

extracting an IPv4 address from an IPv6 address found in said inter-domain routing advertisement; and referencing an IPv4 forwarding table with said IPv4 address to retrieve a label stack associated with said IPv4 address.

6. The method of claim 5 further comprising:

storing an entry in said IPv6 forwarding table, said entry comprising said forwarding equivalence class identifier and said label stack.

7. Apparatus for operating a network node to forward a packet employing a first addressing scheme through a label switched network employing a second addressing scheme, said method comprising:

means for receiving said first addressing scheme packet;

means for extracting destination address information according to said first addressing scheme from said first addressing scheme packet;

means for retrieving from a forwarding table, an MPLS label stack specifying a label switched path in said label switched network employing said second addressing scheme, said MPLS label stack selected based on said destination address information according to said first addressing scheme, said forwarding table comprising said destination address information identifying a forwarding equivalence class and said corresponding MPLS label stack; and means for forwarding said first addressing scheme packet along with said label to a next hop in said label switched path without encapsulation within a packet incorporating address information specified by said second addressing scheme.

8. The apparatus of claim 7 wherein said first addressing scheme comprises an IPv6 addressing scheme and said first addressing scheme packet comprises an IPv6 packet and said second addressing scheme comprises an IPv4 addressing scheme.

9. A computer program product for operating a network node to forward a packet employing a first addressing scheme through a label switched network employing a second addressing scheme, said computer program product comprising:

code that receives said first addressing scheme packet;

code that extracts destination address information according to said first addressing scheme from said first addressing scheme packet;

code that retrieves from a forwarding table, an MPLS label stack specifying a label switched path in said label switched network employing said second addressing scheme, said MPLS label stack selected based on said destination address information according to said first addressing scheme, said forwarding table comprising said destination address information identifying a forwarding equivalence class and said corresponding MPLS label stack;

code that forwards said first addressing scheme packet along with said label to a next hop in said label switched path without encapsulation within a packet incorporating address information specified by said second addressing scheme; and a computer-readable storage medium that stores the codes.

10. The computer program product of claim 9 wherein said first addressing scheme comprises an IPv6 addressing scheme and said first addressing scheme packet comprises an IPv6 packet and said second addressing scheme comprises an IPv4 addressing scheme.

11. The computer program product of claim 10 wherein said label switched network comprises an MPLS IPv4 network.

12. The computer program product of claim 11 wherein said forwarding table is n IPv6 forwarding table and further comprising:

code that establishes contents of said IPv6 forwarding table based on a received inter-domain routing advertisement.

13. The computer program product of claim 12 wherein said code that establishes comprises:

code that extracts a forwarding equivalence class identifier from said inter-domain routing advertisement;

code that extracts an IPv4 address from an IPv6 address found in said inter-domain routing advertisement; and code that references an IPv4 forwarding table with said IPv4 address to retrieve a label stack associated with said IPv4 address.

14. The computer program product of claim 13 further comprising:

code that stores an entry in said IPv6 forwarding table, said entry comprising said forwarding equivalence class identifier and said label stack.

15. A network device for forwarding a packet employing a first addressing scheme through a label switched network employing a second addressing scheme, said network device comprising:

a processor that executes instructions; and a memory that stores said instructions, said instructions comprising:

code that receives said first addressing scheme packet;

code that extracts destination address information according to said first addressing scheme from said first addressing scheme packet;

code that retrieves from a forwarding table, an MPLS label stack specifying a label switched path in said label switched network employing said second addressing scheme, said MPLS label stack selected based on said destination address information according to said first addressing scheme, said forwarding table comprising said destination address information identifying a forwarding equivalence class and said corresponding MPLS label stack; and code that forwards said first addressing scheme packet along with said label to a next hop in said label switched path without encapsulation within a packet incorporating address information specified by said second addressing scheme.

16. The network device of claim 15 wherein said first addressing scheme comprises an IPv6 addressing scheme and said first addressing scheme packet comprises an IPv6 packet and said second addressing scheme comprises an IPv4 addressing scheme.

17. The network device of claim 16 wherein said label switched network comprises an MPLS IPv4 network.

18. The network device of claim 17 wherein said code that establishes comprises:

code that extracts a forwarding equivalence class identifier from said inter-domain routing advertisement;

code that extracts an IPv4 address from an IPv6 address found in said inter-domain routing advertisement; and code that references an IPv4 forwarding table with said IPv4 address to retrieve a label stack associated with said IPv4 address.

19. The network device of claim 18 wherein said forwarding table is an IPv6 forwarding table and said instructions further comprise:

code that stores an entry in said IPv6 forwarding table, said entry comprising said forwarding equivalence class identifier and said label stack.

20. The method of claim 1 wherein said forwarding table is an IPv6 forwarding table and further comprising:

receiving an inter-domain routing advertisement comprising a forwarding equivalence class identifier and an IPv4 address; and referencing an IPv4 forwarding table with said IPv4 address to retrieve said label stack associated with said IPv4 address;

adding a new entry to said IPv6 forwarding table.

21. The method of claim 20 wherein said new entry comprises:

an IPv6 forwarding equivalence class;

said label stack; and an output interface.

\* \* \* \* \*